US005640757A

United States Patent [19]

Matsuoka

[11] Patent Number: 5,640,757

[45] Date of Patent: Jun. 24, 1997

[54] APPARATUS FOR MANIPULATING AND DETECTING PRESENCE OR ABSENCE OF HARNESS APPLICATOR

[75] Inventor: Jun Matsuoka, Shizuoka-ken, Japan

[73] Assignee: Yazaki Corporation, Tokyo, Japan

[21] Appl. No.: 401,003

[22] Filed: Mar. 9, 1995

Related U.S. Application Data

[63] Continuation-in-part of Ser. No. 60,841, May 14, 1993, abandoned.

[30] Foreign Application Priority Data

May 14, 1992 [JP] Japan .................................... 4-121920

[51] Int. Cl.[6] ............................ B23P 21/00; B23Q 15/00

[52] U.S. Cl. ................................ 29/714; 29/721; 29/759; 29/760

[58] Field of Search ............................ 29/749, 748, 750, 29/755, 759, 760, 714, 721

[56] References Cited

U.S. PATENT DOCUMENTS

| | | | |
|---|---|---|---|
| 4,159,565 | 7/1979 | Schwalm | 29/759 |
| 4,219,913 | 9/1980 | Johnson, Jr. | 29/749 |
| 4,292,732 | 10/1981 | Tucci | 29/749 |
| 4,825,530 | 5/1989 | Komuro | 29/749 |
| 4,841,631 | 6/1989 | Selby | 29/749 |
| 4,953,801 | 9/1990 | Oikawa | 248/65 |
| 5,016,842 | 5/1991 | Suzuki et al. | 248/68.1 |

FOREIGN PATENT DOCUMENTS

| | | | |
|---|---|---|---|
| 3309348 | 9/1984 | Germany | 29/755 |

*Primary Examiner*—David P. Bryant
*Attorney, Agent, or Firm*—Wigman, Cohen, Leitner & Myers, P.C.

[57] ABSTRACT

A mounting device for mounting a harness applicator, such as a clip or a protector, to a wire harness positioned on a common base plate. A limit-switch for sensing the presence of the clip is incorporated in the mounting device. The limit-switch produces a completion signal when the clip is mounted on the harness W. An informing unit lights the lamp for informing a completion of the mounting in response to the completion signal.

6 Claims, 1 Drawing Sheet

APPARATUS FOR MANIPULATING AND DETECTING PRESENCE OR ABSENCE OF HARNESS APPLICATOR

RELATED APPLICATION

This application is a continuation-in-part of a prior application, which was filed on May 14, 1993, and which bears Ser. No. 08/060,841 (now abandoned).

BACKGROUND OF THE INVENTION

Conventional, apparatus for mounting applicators on a harness comprises a mounting unit and a detecting unit wherein the mounting unit mounts a clip and a protector as applicators on a wire harness and the detecting unit detects whether the applicators are mounted on the harness.

The mounting unit comprises a wire base plate, a plurality of spacers, a clip mounting jig and a protector mounting jig. The wire base plate supports the harness wound with previously provided tape. A plurality of spacers is positioned on the wire base plate with a predetermined spacing along a wiring direction of the harness and supports the harness on the wire base plate. The clip mounting device is mounted on the wire base plate and mounts the clip as an applicator on the harness. The mounting device mounts the protector as an applicator on the harness.

On the other hand, the detecting unit comprises a detecting base plate, a limit-switch and an informing unit.

The detecting base plate detects whether or not the clip and the protector are mounted on the harness. The limit-switch is mounted on the detecting base plate and performs the on/off function of a switch in accordance with the pressure of the clip attached to the harness and also in accordance with the pressure of the protector attached to the harness. The informing unit responds to the condition of the limit-switch and indicates whether the mounting is completed or not with a lamp or an alarm.

In a conventional apparatus, a mounting unit mounts a clip and a protector as applicators on a wire harness, and thereafter the wire harness is reset on a detecting unit and the detecting unit detects whether or not the mounting of the clip and a protector is completed.

When the detecting unit detects that the applicator is not properly mounted on the harness, the harness is detached from the detecting base plate and is again mounted on the mounting unit, and then the mounting of the armor parts on the harness is corrected. Therefore, there is a problem in that it takes a long time to mount the armor parts on the harness and detect the mounting.

SUMMARY OF THE INVENTION

It is an object of the present invention to provide an apparatus which reduces the time necessary for mounting and detecting the mounting of a harness applicator such as a clip or a protector to a wire harness.

In order to achieve the above object, the present invention provides an apparatus for use in mounting applicator on a harness, comprising:

a base plate for supporting a harness; and a mounting device disposed on the base plate for mounting the armor parts on the harness;

wherein the mounting device includes;

a holding portion detachably holding the applicator in portion, abutting against the harness, and a detecting portion disposed in the holding portion, the detecting portion detecting whether or not the applicator is held in the holding portion, thereby detecting whether or not the applicator is completely mounted on the harness.

In the present invention with the above configuration, the holding portion first abuts against the harness, and then the holding portion leaves the armor part on the harness, and, at the same time, the detecting portion detects that the applicator is not held in the holding portion, so that detecting portion thereby detects that the applicator is mounted on the harness. Consequently, it is possible to prevent a failure in mounting the applicators on the harness and to shorten the time of mounting the applicators on the harness.

DETAILED DESCRIPTION OF THE PREFERRED EMBODIMENTS

An apparatus for mounting applicator on a harness in embodiment according to the present invention will be described hereinafter.

Figure 1:
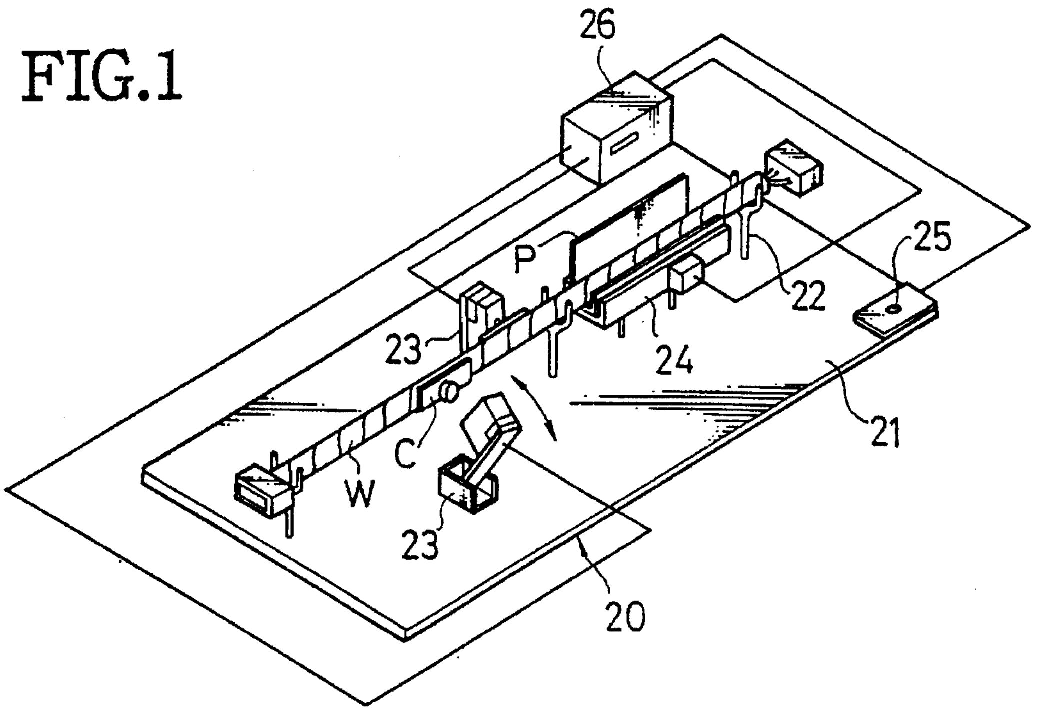
FIG. 1 is a schematic perspective view showing an apparatus for mounting applicators on a harness in an embodiment according to the present invention.

As illustrated in FIG. 1, reference numeral 20 indicates the mounting apparatus of an embodiment of the present invention. The mounting apparatus 20 is provided with a common base plate 21. On the common base plate 21, there is arranged a plurality of spacers 22 with a predetermined spacing, respectively, along a wiring direction of a harness W.

There is also mounted a pair of clip mounting devices 23 and a protector mounting device 24 adjacent to, the harness W on the common base plate 21. Each clip mounting device 23 is for mounting an armor part such as a clip C on the harness W. and the protector mounting device 24 is for mounting another harness applicator such as a protector P on the harness W.

Figure 2:
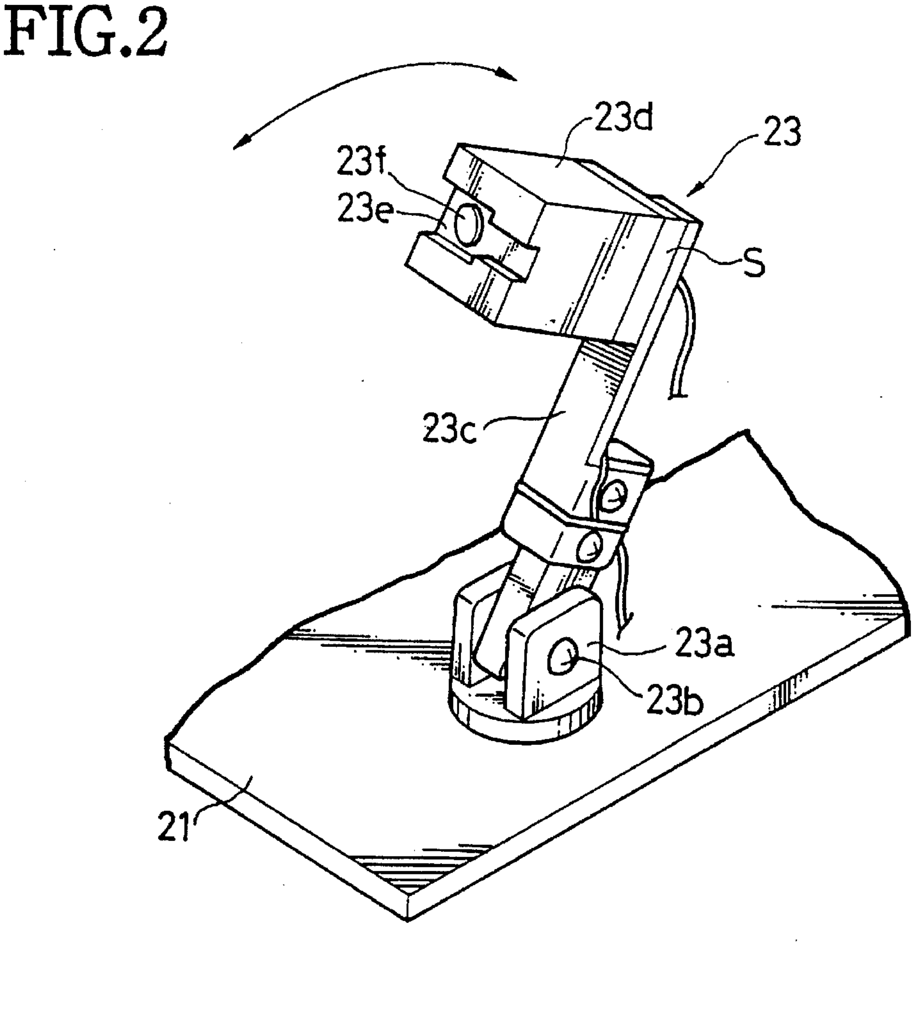
FIG. 2 is a detailed perspective view of a mounting device for mounting a clip to the harness shown in FIG. 1.

As illustrated in FIG.2, each clip mounting device 23 is provided with an arm *23c* having a proximal end and a distal end. The proximal end of the arm *23c* is rotatably supported by the common base plate 21 through a shaft *23b*.

A clip holding portion *23d* is secured to the distal end and the clip holding portion *23d* detachably holds the clip C. The clip holding portion *23d* has a groove *23e* corresponding to the clip C. The clip C is held in the groove *23e* of the clip holding portion *23d* in a detachable manner. The arm *23c* rotates about the shaft *23b* toward the harness W (FIG. 1), so that the clip holding portion *23d* abuts against the harness W positioned between spacers 22. Thus the clip C which is held by the clip holding portion *23d* is attached to the harness W U.S. Pat. No. 4,953,801 wound around harness W (in a manner similar, but not identical, to the employment of adhesive tape to fix an element to a wiring harness in U.S. Pat. No. 4,953,801 cited above). After that the arm *23c* rotates apart from the harness W, so that the clip C is separated from the groove *23e* and is left on the harness W.

In particular, wire harness applicators such as clips and protectors to be mounted to wire harnesses are shown in U.S. Pat. No. 5,016,842 and U.S. Pat. No. 4,953,801, the subject matter of each being incorporated herein by reference.

One such applicator device, disclosed in U.S. Pat. No. 5,016,842, includes a first protector body for substantially enclosing a first wiring harness to be affixed thereto, and a second protector body pivotally connected to the first protector body for substantially enclosing a second wiring harness in parallel configuration. This applicator device is applied to the first wiring harness by passing it through a longitudinal opening between two opposing walls of the first protector body of the device, and is retained therein by a hooked portion of one of the walls.

Another such applicator device disclosed in U.S. Pat. No. 4,953,801, includes a clip for holding a wiring harness of bundled wires, including a curvilinear holder head portion having a concavity for supporting a longitudinal extent of the wiring harness. The concavity of the holder head is brought into abutting engagement with the wiring harness at the selected longitudinal extent thereof and is then taped in place and a mounting portion extending from the holder head is then secured to, for example, an automobile body structure.

A limit-switch S for the clip C is provided for the clip mounting device 23. The limit-switch S has a sensor portion **23*f* which protrudes into the groove 23*e*. When the clip C is held in the groove 23*e*, the sensor portion 23*f* is pressed down so that the switch assumes an OFF state. When the clip C is attached to the harness W and then separated from the groove 23*e***, the sensor portion again protrudes so that the limit-switch S assumes an ON state so as again to produce a completion signal for indicating the completion of the mounting.

The limit-switch S may be ON when the clip C is held in the groove **23*e* and the switch S may be OFF when the C is separated from the groove 23*e***.

Referring to FIG.1 again, the mounting device 24 for mounting the protector P is basically of the same structure as the mounting device 23 for mounting the clip C mentioned above. A top end of the mounting device 24 for mounting the protector P has a basket shape and a pair of side walls with a bottom plate therebetween. The width of the bottom plate is relatively larger than that of the protector P in order to mount the protector P. A limit-switch (not shown) is provided for the mounting device 24 for protector for P on the harness W and a sensor portion of the limit-switch protrudes from the bottom plate or the side walls. The protector P is mounted on the harness W by any suitable, conventional means. Upon completion of the mounting of the protector P on the harness W, the limit-switch for the protector P produces a signal for indicating the completion of the mounting.

An informing unit 26 is mounted on the common base plate 21. The indicating unit 26 is for informing whether or not the armor part is mounted on the harness W. The informing unit 26 is connected with the mounting device 23 for mounting the clip C and the mounting device 24 for mounting the protector P through cables and receives the completion signals from the mounting device 23 or 24, respectively. The informing unit 26 responds to the completion signal to inform whether the mounting is completed or not. Thereafter, the informing unit 26 indicates the result with a light or an alarm. A numeral 25 designates a starting switch for controlling the starting of the informing unit 26.

Next, an operation of the apparatus of this embodiment will be described

First, the mounting devices 23 and 24 are started by turning on a switch (not shown), and then starting the informing unit 26 by turning on the starting switch 25.

The wire harness W is wired on a plurality of the spacers 22 on the common base plate 21 and then the tape is wound around the wire harness W. The clip C is attached to the groove **23*e* of the mounting device 23. The protector P is mounted in the basket-shaped tip of the mounting device 24. The limit-switch S for the clip assumes an OFF state when the clip C presses down on the sensor portion 23*f*. However, the informing unit 26** does not yet indicate whether the armor part is mounted to the harness W or not.

The arm **23*c* of the mounting device 23 rotates toward the harness W, so that the clip holding portion 23*d* abuts against the harness W positioned between spacers 22. Thus the clip C held by the clip holding portion 23*d* is mounted on the harness W U.S. Pat. No. 4,953,801 wound around harness W (in a manner similar, but not identical, to the employment of adhesive tape to fix an element to a wiring harness in U.S. Pat. No. 4,953,801 cited above). Then, the arm 23*c* rotates away from the harness W and the clip holding portion 23*d* leaves the clip C on the harness W. As a result, the sensor portion 23*f*** of the limit-switch S for the clip C protrudes and the switch assumes an ON state to produce the completion signal.

The informing unit 26 receives the completion signal and indicates the mounting by lighting a lamp. On the other hand, when the clip C is not properly mounted on the harness W by the clip holding portion **23*d*, the informing unit 26** does not receive the completion signal and does not light the lamp. In this case, an alarm may be rung.

Therefore, the apparatus for mounting the applicators on the harness in accordance with this embodiment can mount the applicators on the harness, and, at the same time, can detect whether or not the applicators are is completely mounted. It is therefore possible to prevent a failure in mounting the applicators on the harness W and to shorten the time of mounting the applicators on the harness W.

Although a certain embodiment of the invention has been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. An apparatus for detecting and indicating whether a harness applicator is being held or not held by said apparatus when said harness applicator is in a first position and in a second position, respectively, said apparatus comprising:

a base plate for supporting a wire harness;

a holding portion disposed on said plate for holding and positioning said harness applicator in said first position prior to movement toward said wire harness, and for moving said harness applicator to said second position where said wire harness is located;

supporting means on said base plate for supporting said wire harness in said second position;

detecting means provided in said holding portion for detecting whether said harness applicator is being hold in said holding portion and for generating a corresponding holding signal; and informing means for informing whether or not said harness applicator is being held in said holding portion when said harness applicator is in said first position, and whether said harness applicator is being held in said holding portion after said holding portion moves said harness applicator to said second position, in accordance with said holding signal generated by said detecting means.

2. The apparatus as claimed in claim 1, wherein said harness applicator is a wire harness clip.

3. An apparatus as claimed in claim 1, further comprising an arm member pivotably supported on said base plate, said arm member having a proximal end and a distal end, said holding portion being disposed in said distal end of said arm member so that said harness applicator abuts against said harness with a rotation of said arm member.

4. An apparatus as claimed in claim 1, wherein said holding portion is provided with a groove corresponding to a shape of said harness applicator.

5. An apparatus as claimed in claim 1, wherein said detecting means has a limit switch with a sensor portion, said sensor portion being disposed in said holding portion and contacting said harness applicator when said harness applicator is held in said holding portion.

6. An apparatus as claimed in claim 5, wherein said detecting means generates a completion signal after said holding portion moves said harness applicator to said second position and said holding portion is no longer holding said harness applicator.

* * * * *